United States Patent [19]

Beeson et al.

[11] Patent Number: 4,754,417
[45] Date of Patent: Jun. 28, 1988

[54] COMPUTER IMPLEMENTED GO/NO GO GAUGING SYSTEM

[75] Inventors: Don E. Beeson; Karen S. Smith, both of Columbus, Ind.

[73] Assignee: Cummins Engine Company, Inc., Columbus, Ind.

[21] Appl. No.: 912,654

[22] Filed: Sep. 29, 1986

Related U.S. Application Data

[63] Continuation of Ser. No. 584,620, Feb. 29, 1984, abandoned.

[51] Int. Cl.$^4$ .......................... G01B 5/12; G06F 15/46
[52] U.S. Cl. ..................................... 364/560; 33/504; 33/552; 364/571
[58] Field of Search ............... 364/559, 560, 488, 489, 364/474, 475, 571, 167; 33/520, 504, 505, 552; 356/375, 400; 318/567, 569, 600

[56] References Cited

U.S. PATENT DOCUMENTS

| | | | |
|---|---|---|---|
| 3,670,153 | 6/1972 | Rempert et al. | 364/559 |
| 4,030,201 | 6/1977 | Possati et al. | 364/560 |
| 4,038,576 | 8/1977 | Smith et al. | 364/560 |
| 4,181,958 | 1/1980 | Juengel et al. | 364/560 |
| 4,221,053 | 9/1980 | Bobel, II et al. | 33/504 |
| 4,241,507 | 12/1980 | Clarey | 33/125 R |
| 4,241,509 | 12/1980 | Possati | 33/505 |
| 4,296,474 | 10/1981 | Hurt | 364/560 |
| 4,390,955 | 6/1983 | Arimura | 364/559 |

OTHER PUBLICATIONS

"An Interactive Computer Approach to Tolerance Analysis" by D. Bohling et al, IEEE Transactions of Computers, vol. C-19, No. 1, pp. 10–16, Jan. 1970.

American National Standard Engineering-Drawing and Related Practices-Dimensioning and Tolerancing, ANSI Y 14.5-1982, ASME, New York (Supersedes ANSI Y 14.5-1973).

"A Computer Simulation of a True Position Feature Pattern Gauge", J. R. O'Leary, 1981, Conference of Design Engineering Division of the American Society of Mechanical Engineers, 81-DE-9.

*Primary Examiner*—Felix D. Gruber
*Attorney, Agent, or Firm*—Sixbey, Friedman, Leedom and Ferguson

[57] ABSTRACT

An inspection system for determining if the measured features within a measured pattern of features on a mechanical component are within specified tolerances by repositioning a representation of the dimensioned features relative to the corresponding measured pattern of features within the coordinate system and by determining whether each measured feature is within the tolerance zone associated with the corresponding dimensioned feature. To accomplish this purpose, a data processor is provided for simulating the relative positions of the measured and dimensioned pattern of features and for moving in incremental steps the dimensional pattern relative to the measured pattern within a predetermined coordinate system. The directions of movement for the incremental steps are chosen by the data processor by simulating restoring forces between corresponding features of the measured and dimensioned patterns. In one mode of operation, these restoring forces are simulated only for those measured features that are outside of the tolerance zone of the corresponding dimensioned features and additional trapping forces are simulated between corresponding features of the measured pattern and the tolerance zone boundary of that feature if the measured features are up against and inside the tolerance zone boundaries of the corresponding dimensioned features and neither restoring nor trapping forces are simulated if the measured feature is inside its tolerance zone but not up against the tolerance zone boundary. In another mode, the trapping forces are turned off and all the restoring forces are used to determine the direction of movement of each incremental step. The second mentioned mode is used to obtain a good starting position for the first mode mentioned.

12 Claims, 3 Drawing Sheets

Microfiche Appendix Included
(2 Microfiche, 89 Pages)

(MODE 1)

(MODE 2)

(MODE 3)

COMPUTER IMPLEMENTED GO/NO GO GAUGING SYSTEM

This application is a continuation of application Ser. No. 584,620 filed Feb. 29, 1984, now abandoned.

This patent application includes a microfiche appendix comprising 2 microfiche and 89 pages.

TECHNICAL FIELD

This invention relates to a computer implemented inspection system for determining if a pattern of features, such as holes, formed in a mechanical component, is within tolerance and, if not, for determining if one or more of the features can be reworked to cause the resulting pattern of features to be within tolerance.

BACKGROUND ART

A widely accepted standard for controlling tolerances in mechanical components is set forth in the American National Standard for Dimensioning and Tolerancing, ANSI Y 14.5-1973, ASME, New York, 1973. One aspect of the standard deals with the location of feature patterns such as the pattern of holes formed in a mechanical component. In some instances, the location of a hole center relative to other holes within the same pattern is more critical than the location of the pattern as a whole. Thus, two independent sets of tolerances may be developed. One of these stipulates the tolerance on a hole center when measured relative to the other centers within a pattern. The resulting regions, wherein a hole center may be acceptably located, are defined as the feature relating tolerance zones (FRT zones). The regions generated by the other specified tolerances are defined as the pattern locating tolerance zones (PLT zones), and their function is to tolerance a hole center relative to a component's global datum. As defined in the above noted American National Standard, two acceptable schemes may be adopted for specifying the above noted zones, that is, composite positional tolerancing (CPT) and positional plus minus tolerancing (PPMT). A detailed description of these schemes is found in an article by J. R. O'Leary entitled "A Computer Simulation of a True Position Feature Pattern Gauge", 1981 Conference of Design Engineering Division of The American Society of Mechanical Engineers, 81-DE-9.

As pointed out in the O'Leary article, the need to control cost has propelled consideration of computer implemented systems for determining if mechanical components are within tolerances as a substitute for the use of mechanical gauges (often referred to as a go/no go gauge) or for the use of graphic pattern inspection of templates constructed by optical scanning of the mechanical component. However, such attempts at computer implemented systems have not been entirely successful. For example, the O'Leary article suggests a mathematical approximation to the use of a go/no go gauge which is based on the simulated movement of a pattern of measured features (such as hole centers on a mechanical component) relative to a dimensional pattern (desired pattern of hole centers) in order to minimize a response function based on a measure of the total of all vectors connecting corresponding measured and dimensioned features. After the simulated movement is effected, each of the measured features can be tested to see if the feature related tolerance has been satisfied.

While the proposed O'Leary response function leads to the acceptance of only mechanical components meeting the required tolerances, some good components might be missed since the response function does not necessarily result in optimally positioning the hypothetical "rigid body" but only approximates such optimal positioning. The O'Leary article does suggest that a more rigorous solution could be achieved by an iterative process wherein a measure of the total vectors is minimized in a constrained least squares sense which is said to be analogous to attaching linear restoring springs between the measured and dimensioned features and then seeking the resulting constrained equilibrium position. As pointed out in the O'Leary article, however, such a solution would require two levels of optimization and extensive computer calculations. O'Leary's remedy is to abandon the linear springs analogy in favor of an unconstrained system based on the use of highly non-linear restoring springs for purposes of deriving his response function. Moreover, to implement the O'Leary response function in a case in which positioning plus minus tolerancing is used, a second set of non-linear restoring springs with non-circular potential lines is required. Clearly, the O'Leary algorithm is only an approximate simulation of a mechanical gauge for testing tolerances for a pattern of features on mechanical components. Because the tolerance zones are considered only after the optimization search is finished, it is possible for a good part to be rejected as being out of tolerance. Also no provision is made for unusually shaped tolerance zone boundaries.

In U.S. Pat. No. 4,296,474 to Hurt an inspection system for inspecting plural features on machined parts is provided by a data processor programmed to cause a mathematical translation and rotation of a pattern of measured features into their "closest fit" with a pattern of dimensional (nominal) features after which the processor compares the measured features relative to the corresponding dimensioned features to determine if all measured features are within specified tolerances. The "best fit" of the Hurt patent is achieved by first computing the centroids of the pattern of measured and dimensioned features and, thereafter, causing a relative translation of the patterns to superimpose the centroids. Thereafter, the patterns are rotated relatively to minimize the sum of the areas defined by circles whose radii are equal to the distances between corresponding measured and dimensioned features. Obviously, a system of this type can not take into account the size and shape of the feature tolerance zones in determining a "best fit" and thus might reject a mechanical component which is, in fact, acceptable. Also this system does not allow for total movement of the pattern.

Numerous techniques are known for measuring the location of features on a mechanical component such as disclosed in U.S. Pat. Nos. 4,241,509; 4,221,053; 4,181,958 and 4,030,201. However, none of these patents suggest systems for simulating the repositioning of a pattern of measured features to a pattern of dimensioned features.

The prior art has, thus, failed to disclose a computer implemented inspection system for accurately simulating a go/no go gauge for determining if a pattern of features on a mechanical component are within tolerances and, if not, for determining if one or more of the features can be reworked to cause the resulting pattern of features to be within tolerance.

DISCLOSURE OF THE INVENTION

It is a general object of this invention to overcome the deficiencies of the prior art by providing a computer implemented inspection system for determining if a pattern of features, such as holes in a mechanical component, is within tolerance in the same manner as a mechanical go/no go gauge whereby only mechanical components having an out-of-tolerance pattern of features will be identified as a reject by the system.

Another object of this invention is to provide an inspection system for determining if the measured features within a measured pattern of features on a mechanical component are within specified tolerances by repositioning a representation of the dimensioned features relative to the corresponding measured pattern of features within the coordinate system and by determining whether each measured feature is within the tolerance zone associated with the corresponding dimensioned feature. To accomplish this purpose, data processing means are provided for simulating the relative positions of the measured and dimensioned pattern of features and for moving in incremental steps the dimensioned pattern relative to the measured pattern within the predetermined coordinate system. By moving the simulated patterns, the data processing means determines if all of the simulated features of a mechanical component can be positioned within the specified tolerance zones associated with the corresponding dimensioned pattern of features. The directions of movement for the incremental steps are chosen by the data processing means by simulating restoring forces between corresponding features of the measured and dimensioned patterns. In one mode of operation, these restoring forces are simulated only for those measured features that are outside of the tolerance zone of the corresponding dimensioned features and additional trapping forces are simulated between corresponding features of the measured pattern and the tolerance zone boundary of that feature if the measured features are up against and inside the tolerance zone boundaries of the corresponding dimensioned features and neither restoring nor trapping forces are simulated if the measured feature is inside its tolerance zone but not up against the tolerance zone boundary. The trapping springs exist continuously on the inside of the tolerance zone boundaries and have very high spring rates relative to the restoring springs. When a measured center is up against and inside the boundary, the trapping spring does not allow the measured center to substantially deform the boundary. This results in the boundary moving away from the measured center until there is no contact between the boundary and measured center or until the total potential energy of all spring forces is a minimum. In a second mode, the trapping forces are turned off and all the restoring forces are used to determine the direction of movement of each incremental step. The second mode mentioned is used to obtain a good starting position for the first mode mentioned.

Yet another object of the subject invention is to provide a data processing means functioning as described above and further including potential energy determining means for calculating a potential energy value representative of the theoretical potential energy resulting from the creation of (1) the restoring forces by simulated attachment of ideal springs of predetermined linear spring rate between corresponding features in a dimensioned pattern and the measured pattern for restoring forces and (2) the trapping forces by simulated existence of trapping springs with a significantly larger linear spring rate on the inside of the tolerance zone boundaries when held in a simulated relative position by the data processing means.

A more specific object of the subject invention is to provide a data processing means of the type described above and further including pattern incrementing means for moving on a trial basis the measured and dimensioned patterns from the relative position simulated by a data processing means in a cycle of trial incremental steps of predetermined magnitude along each one of a set of corresponding directions and further including direction determining means for causing the potential energy determining means to calculate the potential energy after each trial incremental step of a cycle of incremental steps and for selecting the one trial incremental step in each cycle of trial incremental steps which produces the greatest reduction in the potential energy value assuming at least one trial incremental step within a cycle results in a reduction in the potential energy value. When no such reduction in potential energy value occurs, the direction determining means causes the magnitude of each incremental step in a succeeding cycle of trial incremental steps to be reduced by one half. Thereafter, a pattern repositioning and control means operates to reposition the measured and dimensioned patterns relative to one another in accordance with the incremental steps selected by the direction determining means. This pattern repositioning and control means also commences a new cycle of trial incremental steps after each repositioning function or after the magnitude of the incremental steps has been reduced by one half. The succeeding cycles of trial incremental steps are terminated when the magnitude of each incremental step is reduced below a predetermined value.

Yet another object of the subject invention is to provide data processing means as described above further including reworking means for determining whether a out-of-tolerance pattern of measured features on a mechanical component may be modified to cause the resulting pattern of features to be within the specified tolerances.

Still other and more specific objects of this invention may be appreciated from a consideration of the following Brief Description of the Drawings and description of the Best Mode for Carrying Out the Invention.

BEST MODE FOR CARRYING OUT THE INVENTION

Before proceeding with a detailed description of a system for implementing the subject invention, reference will first be made to one of the two acceptable schemes for specifying feature relating tolerance zones (FRT zones) and pattern locating zones (PLT zones) as described in American National Standard ANSI Y14.5-1973. The manner of operation of the subject invention will then be described with particular reference to the scheme known as composite positional tolerancing (CPT). However, the subject system is fully capable of implementing the second scheme known as positional plus minus tolerancing (PPMT) as will be discussed more fully herein below.

Figure 1:
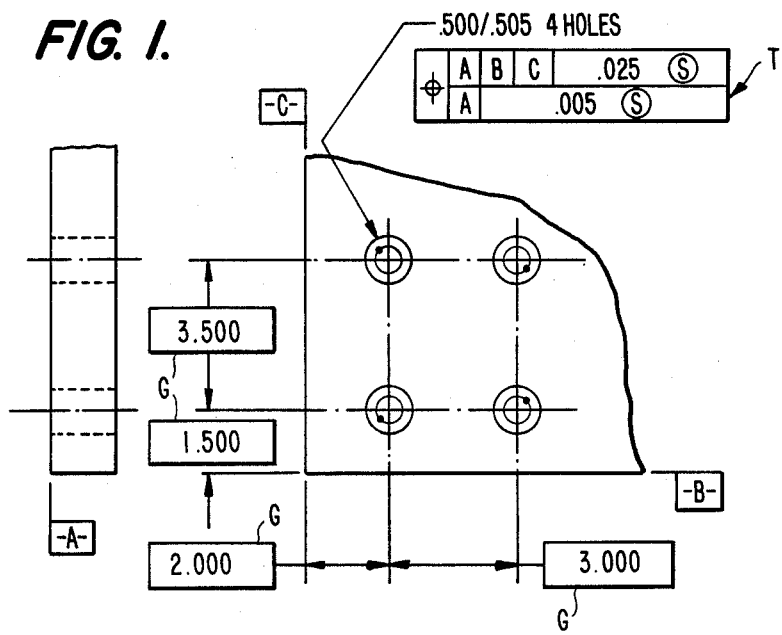
FIG. 1 is a schematic illustration of an engineering drawing disclosing a typical composite positional tolerancing scheme for representing the tolerances for a pattern of holes in a mechanical component.

FIG. 1 illustrates a typical engineering drawing upon which CPT tolerance information is shown in a box labelled T along with conventional geometric dimensioning information shown in boxes labelled G. The number 0.025 relates to the pattern locating tolerance zones centered at the theoretical locations for each of the hole centers while the number 0.005 indicates the feature relating tolerance (FRT) zones associated with each hole center. The FRT zones float as a pattern relative so long as the locations relative to one another are fixed.

Figure 2:
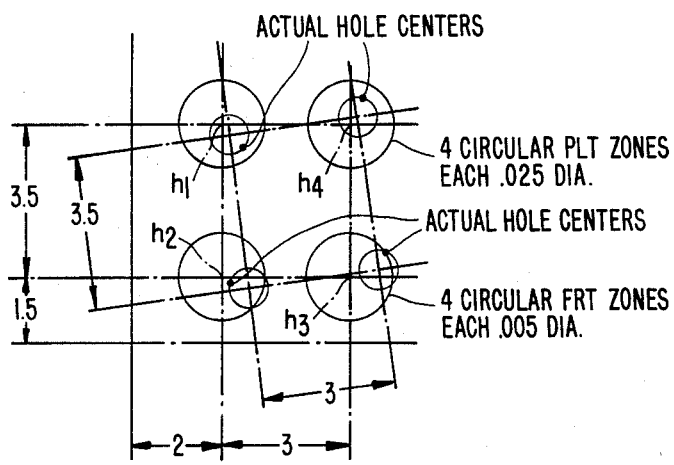
FIG. 2 is a schematic interpretation of the composite positioning tolerancing information contained in FIG. 1.

For a better understanding of the meaning of the tolerances referred to in FIG. 1, reference is made to FIG. 2 wherein the four circular PLT zones (the larger circles) are shown as having been centered about the theoretical ideal centers for each of the corresponding four holes illustrated in FIG. 1. The FRT zones (the smaller circles) are also related to one another by the same basic dimensions relating the ideal hole centers relative to one another. However, the FRT zones are free to float as a pattern so long as their locations relative to one another are fixed. The criteria for the acceptability of a pattern of measured hole centers is first that each hole center be within its corresponding PLT zone and secondly that there exist a configuration for the pattern of FRT zones such that each hole center is located within its respective FRT zone. It is thus clear that the pattern of actual hole centers referred to in FIG. 2 are acceptable since there is a configuration for the pattern of FRT zones that permits each hole to be located within its respective FRT zone. At the same time, the actual hole centers are each located within their respective PLT zones. For purposes of this description, a pattern of measured features, such as the actual hole center illustrated in FIG. 2, will be referred to as a measured pattern of features. The pattern of dimensioned features which represents the ideal desired location separated by the geometric dimensions G of FIG. 1 will be referred to as the dimensioned pattern of features. In FIG. 2, the dimensioned pattern of features is represented by the four points marked $h_1$, $h_2$, $h_3$ and $h_4$.

Figure 3A:
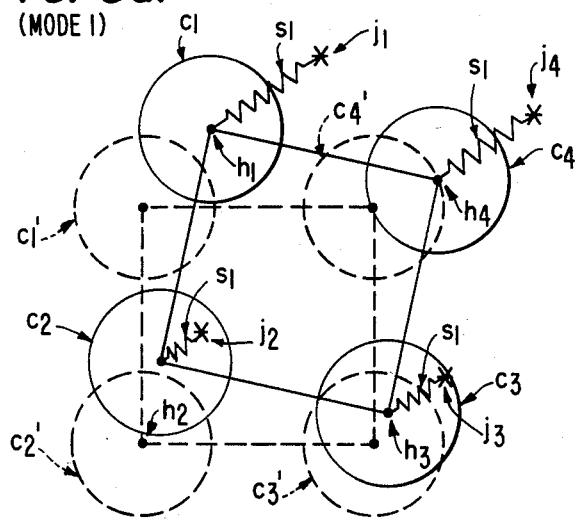
FIGS. 3, 3a and 3b are schematic illustrations of the simulated ideal linear springs for producing restoring forces between corresponding features in measured and dimensioned patterns and trapping forces between corresponding measured features and tolerance zone boundaries.
Figure 3B:
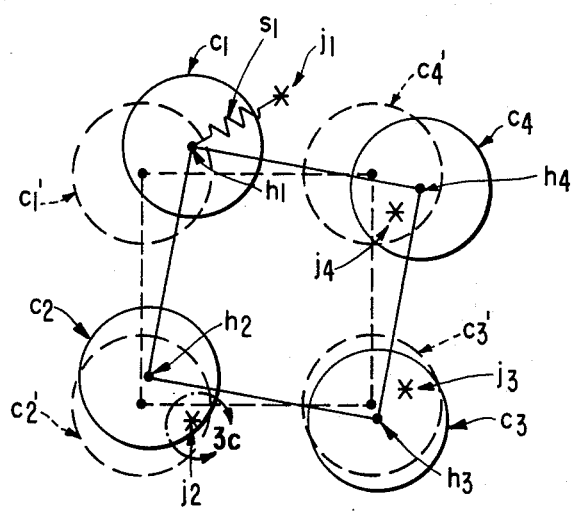
Figure 3C:
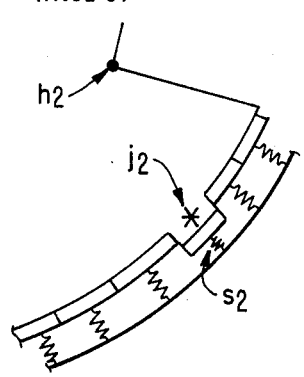

As stated above, one of the primary objectives of this invention is to insure that mechanical components are being properly tested to determine if a pattern of features, such as holes, contained in a mechanical component is within tolerance. This objective is achieved by a computer controlled inspection system including means for generating signals representative of the measured pattern of features, such as the actual location of center holes in a mechanical component and means for generating signals representative of the dimensioned pattern of corresponding features, such as the desired geometric location of the hole centers. Using these input signals, the computer implements a type of unconstrained least squares (minimum potential energy) solution, the fundamental characteristic of which is illustrated in FIGS. 3a and 3b wherein the dimensioned pattern feature, which represents the desired hole centers in a mechanical component, are shown as points $h_1$ through $h_4$. FIGS. 3a and 3b also illustrate a measured pattern of features, representative of the actual measured location of the hole centers found in a mechanical component being tested by the system. The measured pattern is represented by points $j_1$, $j_2$, $j_3$ and $j_4$. The circles $c_1$, $c_2$, $c_3$ and $c_4$ represent the feature related tolerance (FRT) zones which may be moved as a pattern for purposes of determining if the actual measured hole centers $j_1$ through $j_4$ may be caused to reside within FRT zones $c_1$ through $c_4$. The previous position of the dimensioned pattern is illustrated by the dashed circles $c'_1$, $c'_2$, $c'_3$ and $c'_4$.

A common approach of many computer implemented inspection system designed to test for feature related tolerances is to cause a simulated relative movement between the measured and dimensioned patterns to determine if there exists a set of translations and rotations which will cause the measured pattern features to reside within corresponding FRT zones. Prior attempts to design a computer implemented system for achieving this function have allowed in certain circumstances for some patterns of measured features to be rejected as being out of tolerance when in fact such measured pattern was actually in tolerance. The subject invention overcomes this deficiency of the prior art by implementing an iterative process by which trial relative movements of the measured and dimensioned patterns are undertaken in cycles in an attempt to minimize the theoretical potential energy which would exist if linear contact springs with high spring rates existed continuously on the inside of the tolerance zone boundaries and under certain conditions selected corresponding measured and dimensioned features were connected by ideal linear springs. The subject invention differs from prior computer simulated systems of this type by assigning very stiff linear springs continuously along the inside of the FRT zone of its corresponding dimensioned feature and/or assigning linear springs between corresponding features of the measured and dimensioned patterns all depending upon the mode of operation and where the measured features lie relative to the corresponding FRT zones. In particular, in one mode, linear ideal restoring springs are connected between all corresponding features of the measured and dimensioned patterns. As an example, see FIG. 3a. In a second mode of operation, linear ideal restoring springs are connected between corresponding features of the measured and dimensioned patterns only if the measured features are outside of the tolerance zones of the corresponding dimensioned features. No springs are connected between the in-tolerance measured features and their corresponding dimensioned features. Trapping springs also exist continuously on the inside of the tolerance zone boundaries. As an example, FIG. 3b shows that $j_1$ is the only measured feature which lies outside of its corresponding FRT zone $c_1$. Accordingly, during this second mode of operation, only a single ideal restoring spring $s_1$ will be connected between points $j_1$ and $h_1$.

Measured feature $j_2$ is up against and inside the tolerance zone boundary and so stiff trapping spring $s_2$ is compressed a small amount. Measured features $j_3$ and $j_4$ are in-tolerance features and so do not contribute any potential energy to the system. By this technique, a single unique solution will result regardless of the coordinate system which is selected for describing the patterns of measured and dimensioned features. Moreover, the spring constants of the trapping springs are very significantly greater (for example, by a factor of ten to the tenth power) than are the spring constant of the restoring springs $s_1$. The movement of a measured feature into the FRT zone of a corresponding feature will result in that measured dimensioned feature being "trapped" within the FRT zone throughout subsequent incremental movements in the relative positions of the measured and dimensioned patterns.

Figure 4:
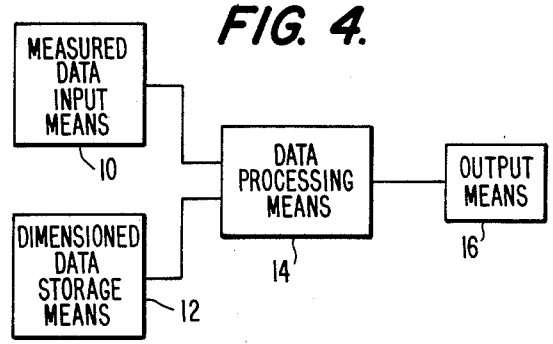
FIG. 4 is a schematic illustration of the important operational components of a computer implemented system designed in accordance with the subject invention.

Reference is now made to FIG. 4 which is a broad schematic illustration of an inspection system designed in accordance with the subject invention. Such a system would include a measured data input means 10 for providing measurement signals representative of the actual positions of the features on a mechanical component. The measured data input means 10 may include an optical scanner or a set of mechanical probes combined with transducers for sensing the actual location of holes in a mechanical component being tested. Examples of suitable measure data means 10 would be the multiple probe gauge system for producing digitized signals in response to a plurality of probes disclosed in U.S. Pat. No. 4,181,958. Another type of measure data means suitable for use with the subject system would be the measuring machine disclosed in U.S. Pat. No. 4,296,474.

The system of FIG. 4 further includes a dimensioned data storage means for providing dimensioned signals representative of the position of the features in the dimensioned pattern of features identifying the ideal location of the features on the mechanical component being tested.

The system of FIG. 4 includes a data processing means 14 responsive to the measurement signals and dimension signals produced by the measured data input means 10 and the dimensioned data storage means 12. The dimension data storage means 12 would normally be formed from a conventional read/write data storage means while the data processing means would include a general purpose digital computer programmed in accordance with the Fortran program set forth in the Appendix attached to this specification. When so programmed, the data processing means 14 simulates the relative position of the measured and dimensioned pattern of features. The data processing means 14 also moves in incremental steps the dimensioned pattern relative to the measured pattern within a predetermined coordinate system to determine if all of the simulated features of a mechanical component can be positioned within the specified tolerance zones associated with the corresponding dimensioned pattern features. When a mechanical component is inspected, the data processing means will initially operate in a first mode to establish a good starting point which is independent of the measuring coordinate system. After which, data processing means will operate in a second mode to produce a final repositioning of the measured and dimensioned patterns.

In mode 1 of operation, implemented by the section of the attached program entitled POTMIN 1, data processing means 14 chooses the direction for movement of incremental steps by simulating restoring forces between corresponding features of all the measured and dimensioned patterns. In mode 2 of operation, implemented by the section of the program entitled POTMIN 2, the direction of movement for the incremental steps are chosen by simulating restoring forces between corresponding features of the measured and dimensioned patterns if the measured features are outside of the tolerance zones of the corresponding dimensioned features. In this mode trapping forces, substantially larger than the restoring forces are simulated between corresponding features of the measured and dimensioned patterns if the measured features are up against the inside of the tolerance zones boundaries of the corresponding dimensioned features. The trapping forces simulated in mode 2 are turned off during the first mode of operation of the data processing means.

As further illustrated in FIG. 4, a system designed in accordance with the subject invention includes an output means 16 for producing output signals indicative of whether all of the measured features fall within the tolerance zones of the corresponding dimensioned features after the data processing means has completed the process of moving the measured and dimensioned patterns in accordance with the program set forth in the attached appendix.

Figure 5:
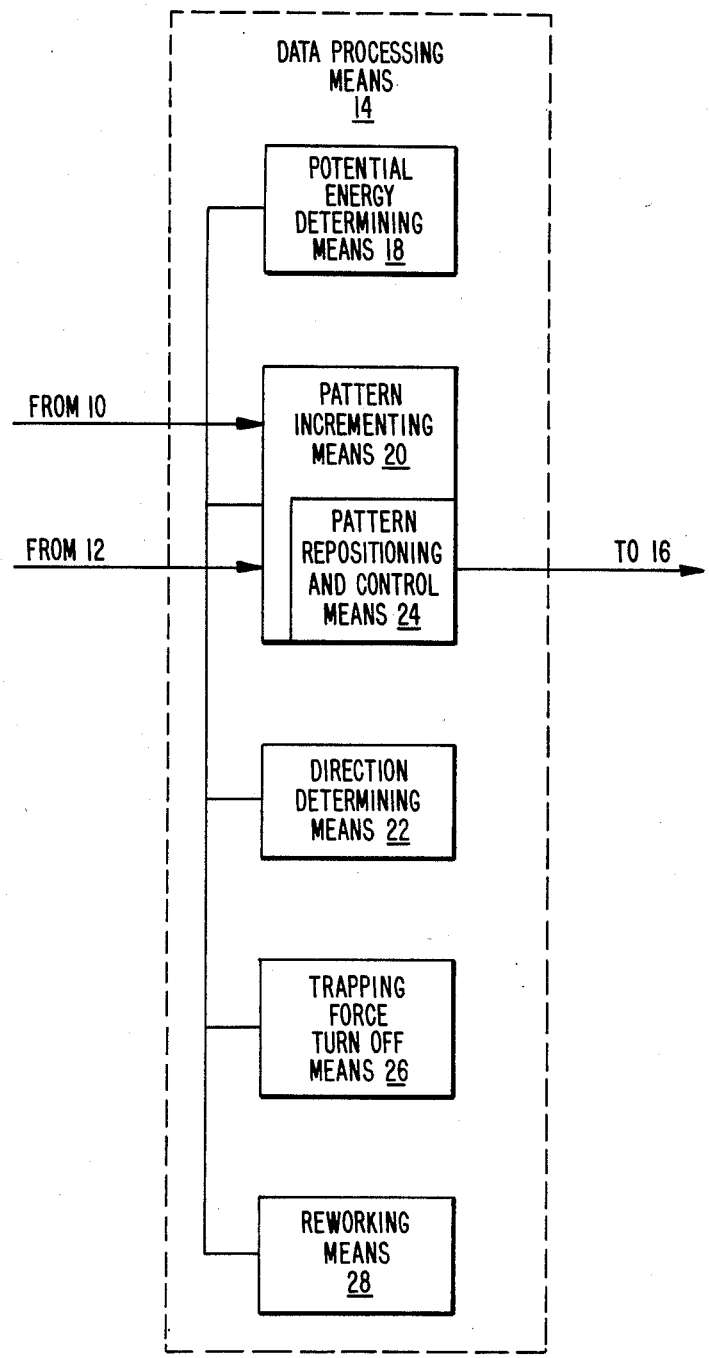
FIG. 5 is a more detailed schematic illustration of the data processing means employed in the overall system illustrated in FIG. 4.

To get a more complete understanding of the operation of the subject system, reference is now made to FIG. 5 in which the important operational components of the data processing means 14 have been illustrated in schematic form. The data processing means 14 includes a potential energy determining means 18 for calculating a potential energy value representative of a theoretical potential energy resulting from the creation of restoring forces and trapping forces by the simulated attachment of ideal springs $s_1$ of predetermined linear spring rate between corresponding features in the dimensioned pattern and the measured pattern and the simulated exitence of trapping springs $s_2$ along the inside of the tolerance zone boundaries when held in the simulated relative position by the data processing means. Also included is a pattern incrementing means 20 for moving on a trial basis the measured and dimensioned pattern from the relative position simulated by the data processing means 14 in a cycle of trial incremental steps of predetermined magnitude along one of a set of corresponding directions. After each cycle of trial incremental steps, a direction determining means 22 causes the potential energy determining means 18 to calculate the potential energy for each trial incremental step of a cycle of incremental steps and selects the one trial incremental step in each cycle which produces the greatest reduction in the potential energy value so long as at least one of the incremental steps results in a reduction of the potential energy value. The direction determining means also causes the magnitude of each incremental step in a succeeding cycle of trial incremental steps to be reduced by one half whenever the potential energy values resulting from a cycle of trial incremental steps are all greater than the potential energy of the existing relative position of the measured and dimensioned patterns as simulated by the data processing means. The pattern incrementing means 20 may include a pattern repositioning and control means 24 for positioning the measured and dimensioned patterns relative to one another in the predetermined coordinate system in accordance with the incremental steps selected by the direction determining means. Control means 24 is also designed to commence a new cycle of trial incremental steps after each repositioning function or after the magnitude of the incremental steps has been reduced by one half and for terminating the cycles of incremental steps when the magnitude of each incremental step has been reduced below a predetermined value.

The data processing means 14 also normally includes a trapping force turn off means 26 for causing the potential energy determining means 18 to set all trapping forces to zero when calculating potential energy values. By this procedure, the data processing means will reposition the measured and dimensioned patterns relative to one another to minimize the potential energy taking into account only the restoring forces formed by the restoring springs.

The data processing means 14 may further include a reworking means 28 for responding to a determination by the data processing means 14 that a measured pattern is out of tolerance by determining if a feature can be reworked. This function is performed by selecting the mechanical component hole which is out of tolerance and if it were enlarged to its largest allowable size then its measured center would be farthest from its tolerance zone boundary and simulating an enlargement thereof to its upper geometric tolerance and reinitiating the pattern repositioning function of the data processing means 14 to determine if the measured features are now all within corresponding tolerance zones associated with corresponding dimensioned features.

The various special components referred to above with respect to the data processing means 14 may be performed by hard wired electrical components programmed in a specialized manner to perform the function described above. Alternatively, a general purpose digital computer programmed in accordance with the program listing contained in the microfiche appendix attached herewith would also inherently establish the functional components corresponding to the labelled blocks shown in FIG. 5. For example, the potential energy determining means would be formed by the program routine entitled POT. A pattern incrementing means 20 including the pattern repositioning and control means 24 would be formed by the program routine entitled CONTROL. The direction determining means will be formed by the routine entitled POTMIN 2. The trapping force turn off means 26 will be formed by the routine entitled POTMIN 1 and the reworking means 28 would be formed by the routine entitled SETTOL.

Also included with the computer program set forth in the attached appendix is the first section entitled PREGEM which allows the user to input data and then check the pattern locating tolerances (PLT) as discussed above with respect to FIGS. 1 and 2. The attached computer program also includes a final section entitled GEMTOOL which is programmed to perform tool drift analysis using data bases generated and updated by the sections of the program entitled PREGEM and GEM.

INDUSTRIAL APPLICABILITY

The subject invention would find particular utility in automated manufacturing facilities where relatively complicated machine components such as internal combustion engine heads containing a pattern of bolt holes must be tested for composite positional tolerances. The system is particularly attractive because it is designed to reject only those parts which are truly outside specified tolerances and is also adapted to identify those mechanical components which are capable of being reworked in a manner to bring the component into tolerance. The inspection system designed in accordance with this invention may also be used to determine tool drift thereby allowing the mechanical component manufacturing process to be corrected in a manner to correct tool drift and avoid the manufacture of out of tolerance components.

We claim:

1. An inspection system for determining if the measured features within a measured pattern of features on a mechanical component are within specified tolerances by repositioning a representation of the dimensioned pattern of features relative to corresponding measured features in a dimensioned pattern of features and by determining whether each measured feature is within a tolerance zone associated with the corresponding dimensioned feature, comprising (a) measured data input means for providing measurement signals representative of a measured pattern of features identifying the actual positions of features on a mechanical component being inspected;

(b) dimensioned data storage means for providing dimension signals representative of the position of the features in the dimensioned pattern of features identifying the ideal location of the features on the mechanical component being tested;

(c) data processing means responsive to said measurement signals and said dimension signals for simulating the relative positions of the measured and dimensioned pattern of features and for moving in incremental steps the dimensioned pattern relative to the measured pattern within a predetermined coordinate system to determine if all of the simulated features of a mechanical component can be positioned within the specified tolerance zones associated with the corresponding dimensioned pattern of features wherein in one mode of operation the directions of movement for the incremental steps are chosen by simulating restoring forces between corresponding features of the measured and dimensioned patterns only if the measured features are outside of the tolerance zones of the corresponding dimensioned features and by simulating trapping forces, substantially larger than said restoring forces, where the trapping forces are related to the distance between the corresponding features of the measured pattern and the tolerance zone boundaries of the corresponding dimensioned feature if the measured features are within the tolerance zones of the corresponding dimensioned features and up against the corresponding tolerance zone boundaries; and (d) output means for producing output signals indicative of whether all of the measured features fall within the tolerance zones of all of the corresponding dimensioned features.

2. An inspection system as defined in claim 1, wherein said data processing means includes potential energy determining means for calculating a potential energy value representative of the theoretical potential energy resulting from the creation of the restoring forces by the simulated attachment of ideal springs with predetermined linear spring constants between corresponding features in the dimensioned pattern and the measured pattern and trapping forces by the simulated exitence of springs along the inside of the tolerance zone boundary when held in a simulated relative position by said data processing means.

3. An inspection system as defined in claim 2, wherein said data processing means includes pattern incrementing means for moving on a trial basis the dimensioned patterns from the relative position simulated by said data processing means in a cycle of trial incremental steps of predetermined magnitude along each one of a set of corresponding directions.

4. An inspection system as defined in claim 3, wherein said data processing means further includes direction determining means for causing said potential energy determining means to calculate the potential energy value after each trial incremental step of a cycle of incremental steps and for selecting the one said trial incremental step in each cycle of trial incremental steps which produces the greatest reduction in the potential energy value so long as at least one trial incremental step within a cycle of incremental steps results in a reduction in the potential energy value and for causing the magnitude of each incremental step in a succeeding cycle of trial incremental steps to be reduced by one-half whenever the potential energy values resulting from a cycle of trial incremental steps are all greater than the potential energy value of the existing relative position of the measured and dimensioned patterns as simulated by said data processing means.

5. An inspection system as defined in claim 4, wherein said pattern incrementing means further includes pattern repositioning and control means for repositioning the measured and dimensioned patterns relative to one another in the predetermined coordinate system in accordance with the incremental step selected by said direction determining means and for commencing a new cycle of trial incremental steps after each repositioning function or after the magnitude of the incremental steps has been reduced by one-half and for terminating the cycles of trial incremental steps when the magnitude of each incremental step has been reduced below a predetermined level.

6. An inspection system as defined in claim 5, wherein said data processing means further includes trapping force turn off means for causing said potential energy determining means to set all trapping forces to zero when calculating potential energy values causing said pattern incrementing means, direction determining means, and said pattern repositioning and control means to reposition the measured and dimensioned patterns relative to one another to minimize the potential energy taking into account only the restoring forces.

7. An inspection system as defined in claim 1, wherein the measured features on the mechanical component are the center of holes contained in the mechanical components.

8. An inspection system as defined in claim 3, wherein the set of corresponding directions defined by said pattern incrementing means includes perpendicular linear translations and rotation.

9. An inspection system as defined in claim 8, wherein the relative rotation of the measured and dimensioned patterns implemented by said pattern incrementing means is caused to occur about the measured feature which is closest to the boundary of the tolerance zone associated with the corresponding dimensioned feature.

10. An inspection system as defined in claim 6, wherein said data processing means includes reworking means for responding to a determination by the data processing means that a measured pattern is out of tolerance by determining if a feature can be reworked by selecting the mechanical component hole which allows the greatest relative repositioning of the measured and dimensioned patterns and by simulating an enlargement thereof to its upper geometric tolerance and reinitiating the pattern repositioning functions of said data processing means to determine if the measured features are now all within corresponding tolerance zones associated with corresponding dimensioned features.

11. An inspection system as defined in claim 1 wherein a constant used to calculate the trapping force is substantially greater than the constant used by the restoring force by a factor of approximately ten to the tenth power.

12. An inspection system as defined in claim 11 wherein the trapping forces used exist continuously on the inside of the tolerance zone boundaries whenever a feature of the measured pattern is within the tolerance zone of the corresponding dimensioned feature.

* * * * *